United States Patent
Wu et al.

(10) Patent No.: US 10,797,986 B2
(45) Date of Patent: Oct. 6, 2020

(54) LINK DISCOVERY METHOD AND APPARATUS

(71) Applicant: HUAWEI TECHNOLOGIES CO., LTD., Shenzhen, Guangdong (CN)

(72) Inventors: Xinggui Wu, Nanjing (CN); Jiao Wang, Munich (DE)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 5 days.

(21) Appl. No.: 16/133,286

(22) Filed: Sep. 17, 2018

(65) Prior Publication Data

US 2019/0020570 A1    Jan. 17, 2019

Related U.S. Application Data

(63) Continuation of application No. PCT/CN2017/076927, filed on Mar. 16, 2017.

(30) Foreign Application Priority Data

Mar. 18, 2016  (CN) .......................... 2016 1 0156065

(51) Int. Cl.
*H04L 12/751* (2013.01)
*H04L 12/715* (2013.01)
(Continued)

(52) U.S. Cl.
CPC .............. *H04L 45/02* (2013.01); *H04L 45/26* (2013.01); *H04L 45/38* (2013.01); *H04L 45/64* (2013.01);
(Continued)

(58) Field of Classification Search
CPC ..... H04L 41/0806; H04L 41/12; H04L 45/02; H04L 45/26; H04L 45/38; H04L 45/64; H04L 47/32; H04L 49/355; H04W 28/021
See application file for complete search history.

(56) References Cited

U.S. PATENT DOCUMENTS 9,385,948 B2 *  7/2016  Ding ...................... H04L 45/021
9,467,363 B2 * 10/2016  Gao ......................... H04L 45/18
(Continued)

FOREIGN PATENT DOCUMENTS

CN      101159602 A      4/2008
CN      103067277 A      4/2013
(Continued)

OTHER PUBLICATIONS

Rojas et al., TEDP: An Enhanced Topology Discovery Service for Software-Defined Networking, Aug. 2018, IEEE Communications Letters, vol. 22, No. 8, pp. 1540-1543 (Year: 2018).*

(Continued)

*Primary Examiner* — Eric Nowlin
(74) *Attorney, Agent, or Firm* — Womble Bond Dickinson (US) LLP

(57) ABSTRACT

The disclosure provides a link discovery method and an apparatus. The method includes: sending, by a control plane device, a first message to a plurality of forwarding plane devices in a network to which the control plane device belongs, where the first message is used to instruct each forwarding plane device receiving the first message to send a topology discovery packet at all available ports of the forwarding plane device; receiving, by the control plane device, second messages respectively sent by the plurality of forwarding plane devices, where each of the second messages is generated, according to a first topology discovery packet received at a second port, by a second forwarding plane device sending the second message, and determining, by the control plane device, topology connections between the plurality of forwarding plane devices according to the second messages sent by the plurality of forwarding plane devices.

10 Claims, 4 Drawing Sheets

(51) Int. Cl.
*H04L 12/721* (2013.01)
*H04L 12/931* (2013.01)
*H04L 12/823* (2013.01)
*H04L 12/24* (2006.01)

(52) U.S. Cl.
CPC ............ *H04L 49/355* (2013.01); *H04L 41/12* (2013.01); *H04L 47/32* (2013.01)

(56) References Cited

U.S. PATENT DOCUMENTS

| | | | |
|---|---|---|---|
| 9,537,751 B2* | 1/2017 | Park | H04L 49/15 |
| 9,548,933 B2* | 1/2017 | Murakami | H04L 45/64 |
| 9,549,413 B2* | 1/2017 | Aida | H04L 45/54 |
| 10,270,605 B2* | 4/2019 | Otake | H04L 12/6418 |
| 10,291,555 B2* | 5/2019 | K | H04L 1/188 |
| 10,313,266 B2* | 6/2019 | Tan | H04L 47/805 |
| 10,397,098 B2* | 8/2019 | Song | H04L 12/4641 |
| 10,447,605 B2* | 10/2019 | Vishnoi | H04L 47/2483 |
| 10,608,932 B2* | 3/2020 | Kurudi Matada | H04L 45/028 |
| 2012/0195228 A1* | 8/2012 | Bejerano | H04W 40/246 370/254 |
| 2014/0052843 A1* | 2/2014 | Goyal | H04L 49/70 709/224 |
| 2014/0140216 A1* | 5/2014 | Liu | H04L 45/125 370/238 |
| 2014/0362709 A1* | 12/2014 | Kashyap | H04L 41/12 370/250 |
| 2015/0003259 A1* | 1/2015 | Gao | H04L 45/18 370/244 |
| 2015/0009828 A1* | 1/2015 | Murakami | H04L 47/20 370/235 |
| 2015/0215203 A1* | 7/2015 | Nakano | H04L 45/16 370/392 |
| 2015/0304218 A1 | 10/2015 | Wang et al. | |
| 2015/0327285 A1* | 11/2015 | Aida | H04L 47/20 370/392 |
| 2016/0050081 A1* | 2/2016 | Otake | H04L 12/6418 370/218 |
| 2016/0087872 A1* | 3/2016 | Park | H04L 45/02 709/223 |
| 2016/0254997 A1* | 9/2016 | Kurudi Matada | H04L 45/64 370/392 |
| 2016/0285750 A1* | 9/2016 | Saquib | H04L 45/64 |
| 2017/0104670 A1* | 4/2017 | Song | H04L 45/02 |
| 2017/0104690 A1* | 4/2017 | Tan | H04L 47/805 |
| 2017/0118128 A1* | 4/2017 | Vishnoi | H04L 47/2483 |
| 2017/0142034 A1* | 5/2017 | K | H04L 1/188 |
| 2017/0373941 A1* | 12/2017 | De Brouwer | H04L 43/0811 |
| 2018/0013630 A1* | 1/2018 | Tatlicioglu | H04L 41/12 |
| 2019/0020570 A1* | 1/2019 | Wu | H04L 45/26 |
| 2019/0268282 A1* | 8/2019 | Tan | H04L 45/64 |

FOREIGN PATENT DOCUMENTS

| | | | | |
|---|---|---|---|---|
| CN | 103841015 A | 6/2014 | | |
| CN | 104038446 A | 9/2014 | | |
| CN | 104081731 A | 10/2014 | | |
| CN | 105337857 A | 2/2016 | | |
| EP | 2879335 A4 * | 3/2016 | ............ | H04L 45/16 |
| WO | 2015127107 A1 | 8/2015 | | |

OTHER PUBLICATIONS

Azzouni et al., Limitations of openflow topology discovery protocol, Jun. 30, 2017, IEEE, 2017 16th Annual Mediterranean Ad Hoc Networking Workshop (Med-Hoc-Net), DOI: 10.1109/MedHocNet.2017.8001642 (Year: 2017).*
Wu et al., Software Defined Wireless Mesh Network Flat Distribution Control Plane, Jul. 25, 2019, Future Internet 2019, vol. 11, (accessed at www.mdpi.com/journal/futureinternet), DOI: 10.3390/fi11080166 (Year: 2019).*
Ochoa-Aday et al., eTDP: Enhanced Topology Discovery Protocol for Software-Defined Networks, Feb. 15, 2019, IEEE, IEEE Access, vol. 7, pp. 23471-23487, DOI: 10.1109/ACCESS.2019.2899653 (Year: 2019).*
Open Networking Foundation, OpenFlow Switch Specification, Mar. 26, 2015, Open Networking Foundation, Version 1.5.1 (Year: 2015).*
Pakzad et al., Efficient Topology Discovery in Software Defined Networks, Dec. 17, 2014, IEEE, 2014 8th International Conference on Signal Processing and Communication Systems (ICSPCS), DOI: 10.1109/ICSPCS.2014.7021050 (Year: 2015).*
Toufga et al., OpenFlow based Topology Discovery Service in Software Defined Vehicular Networks : limitations and future approaches, Dec. 7, 2018, 2018 IEEE Vehicular Networking Conference (VNC), DOI: 10.1109/VNC.2018.8628349 (Year: 2018).*
Pakzad Farzaneh et al: "Efficient topology discovery in OpenFlow-based Software Defined Networks", vol. 77, Sep. 18, 2015, pp. 52-61, XP029424925.
OpenFlow Switch Specification Version 1.5.1 ( Protocol version 0x06 ),dated Mar. 26, 2015,total 283 pages.

* cited by examiner

LINK DISCOVERY METHOD AND APPARATUS

CROSS-REFERENCE TO RELATED APPLICATIONS

This application is a continuation of International Application No. PCT/CN2017/076927, filed on Mar. 16, 2017, which claims priority to Chinese Patent Application No. 201610156065.4, filed on Mar. 18, 2016. The disclosures of the aforementioned applications are hereby incorporated by reference in their entireties.

TECHNICAL FIELD

The disclosure relates to the field of computer networks, and more specifically, to a link discovery method and an apparatus.

BACKGROUND

At present, in a link discovery method in software-defined networking (SDN), a controller regularly sends a packet_out request to a switch. Each request corresponds to one port of the switch and instructs the switch to send a Link Layer Discovery Protocol (LLDP) packet at the port. If there are N switches in a network and each switch averagely has P ports, the controller transmits, in each period, N*P packet_out request packets for link discovery. As a scale of the network increases, the quantity N of switches in the network may reach tens of thousands and even hundreds of thousands, and the quantity of ports of a switch may be dozens or close to one hundred. Therefore, N*P may reach an order of magnitude of tens of millions. Transmission of such a large quantity of packets in each period brings heavy load to a control channel, and also increases processing overheads on a control plane.

SUMMARY

The disclosure provides a link discovery method and an apparatus, to greatly reduce packets sent from a control plane device to a forwarding plane device and reduce processing overheads on a control plane.

According to a first aspect, a link discovery method is provided, including: sending, by a control plane device, a first message to a plurality of forwarding plane devices in a network to which the control plane device belongs, where the first message is used to instruct each forwarding plane device receiving the first message to send a topology discovery packet at all available ports of the forwarding plane device; receiving, by the control plane device, second messages respectively sent by the plurality of forwarding plane devices, where each of the second messages is generated, according to a first topology discovery packet received at a second port, by a second forwarding plane device sending the second message, the first topology discovery packet is a topology discovery packet sent by a first forwarding plane device in the plurality of forwarding plane devices at a first port, the first topology discovery packet carries identification information of the first forwarding plane device and identification information of the first port, and the second message carries the identification information of the first forwarding plane device, the identification information of the first port, identification information of the second forwarding plane device, and identification information of the second port; and determining, by the control plane device, topology connections between the plurality of forwarding plane devices according to the second messages sent by the plurality of forwarding plane devices, where a first topology connection determined according to each of the second messages is a topology connection from the first port of the first forwarding plane device to the second port of the second forwarding plane device.

With reference to the first aspect, in a first possible implementation, a specific implementation is: the first message carries a topology discovery packet sending period, and the first message is used to instruct the plurality of forwarding plane devices to use the topology discovery packet sending period as a sending period of the topology discovery packet.

With reference to the first aspect, in a second possible implementation, a specific implementation is: the first message is periodically sent by the control plane device.

With reference to the first aspect, the first possible implementation of the first aspect, or a second possible implementation of the first aspect, in a third possible implementation, before the control plane device sends the first message to the plurality of forwarding plane devices, the method further includes: sending, by the control plane device, a first flow entry to the plurality of forwarding plane devices, where the first flow entry is used to instruct the plurality of forwarding plane devices to forward a received topology discovery packet to the control plane device, where no timeout time is set for the first flow entry; or a first timeout time that is set for the first flow entry is greater than a preset threshold.

With reference to any one of the first aspect or the first possible implementation of the first aspect to the third possible implementation of the first aspect, in a fourth possible implementation, the method further includes: sending, by the control plane device, a second flow entry to the second forwarding plane device according to the first topology connection, where the second flow entry is used to instruct the second forwarding plane device to discard the first topology discovery packet, and a second timeout time related to a time at which the first topology connection becomes invalid is set for the second flow entry; receiving, by the control plane device, a third message sent by the second forwarding plane device, where the third message is generated by the second forwarding plane device after the second flow entry times out and no matching packet is obtained, and the third message is used to indicate that the second flow entry times out, is invalid, or is deleted; and determining, by the control plane device according to the third message, that the first topology connection is invalid, and deleting the first topology connection.

According to a second aspect, a control plane device is provided, configured to perform the method according to the first aspect or any possible implementation of the first aspect.

Specifically, the control plane device may include units configured to perform the method according to the first aspect or any possible implementation of the first aspect.

According to a third aspect, another control plane device is provided, including a memory and a processor. The memory is configured to store an instruction. The processor is configured to execute the instruction stored in the memory. The execution of the instruction stored in the memory causes the processor to perform the method according to the first aspect or any possible implementation of the first aspect.

According to a fourth aspect, a computer-readable storage medium is provided, configured to store a computer program. The computer program includes an instruction used to perform the method according to the first aspect or any possible implementation of the first aspect.

According to a fifth aspect, a link discovery method is provided. The method includes: receiving, by a first forwarding plane device, a first message sent by a control plane device in a network to which the first forwarding plane device belongs, where the first message is used to instruct the first forwarding plane device to send a topology discovery packet at all available ports of the first forwarding plane device; and sending, by the first forwarding plane device, the topology discovery packet at each of all the available ports of the first forwarding plane device, where a first topology discovery packet sent at a first port carries identification information of the first forwarding plane device and identification information of the first port, a second forwarding plane device receiving the first topology discovery packet at a second port can send a second message to the control plane device according to the first topology discovery packet, and the second message carries the identification information of the first forwarding plane device, the identification information of the first port, identification information of the second forwarding plane device, and identification information of the second port.

According to a sixth aspect, a forwarding plane device is provided, configured to perform the method according to the fifth aspect.

Specifically, the forwarding plane device may include units configured to perform the method according to the fifth aspect or any possible implementation of the fifth aspect.

According to a seventh aspect, another forwarding plane device is provided, including a memory and a processor. The memory is configured to store an instruction. The processor is configured to execute the instruction stored in the memory. The execution of the instruction stored in the memory causes the processor to perform the method according to the fifth aspect or any possible implementation of the fifth aspect.

According to an eighth aspect, a computer-readable storage medium is provided, configured to store a computer program. The computer program includes an instruction used to perform the method according to the fifth aspect or any possible implementation of the fifth aspect.

According to a ninth aspect, a link discovery method is provided. The method includes: receiving, by a second forwarding plane device, a first flow entry sent by a control plane device, where the first flow entry instructs the second forwarding plane device to forward a received topology discovery packet to the control plane device; receiving, by the second forwarding plane device, the topology discovery packet at all available ports of the second forwarding plane device; sending, by the second forwarding plane device, a second message to the control plane device, where the second messages is generated by the second forwarding plane device according to a first topology discovery packet received at a second port, the first topology discovery packet is a topology discovery packet sent by a first forwarding plane device in the plurality of forwarding plane devices at a first port, the first topology discovery packet carries identification information of the first forwarding plane device and identification information of the first port, the second message carries the identification information of the first forwarding plane device, the identification information of the first port, identification information of the second forwarding plane device, and identification information of the second port, and the second message is used by the control plane device to establish a first topology connection from the first port of the first forwarding plane device to the second port of the second forwarding plane device; receiving, by the second forwarding plane device, a second flow entry sent by the control plane device according to the first topology connection, where the second flow entry is used to instruct the second forwarding plane device to make the first flow entry invalid and discard the first topology discovery packet, and a second timeout time related to a time at which the first topology connection becomes invalid is set for the second flow entry; and if the second flow entry times out and no matching packet is obtained, sending, by the second forwarding plane device, a third message to the control plane device, where the third message is used to indicate that the second flow entry times out, is invalid, or is deleted, so that the control plane device determines, according to the third message, that the first topology connection is invalid, and deletes the first topology connection.

With reference to the ninth aspect, in a first possible implementation, a specific implementation is: if the second flow entry times out, is invalid, or is deleted, resetting, by the second forwarding plane device, the first flow entry to an effective state.

According to a tenth aspect, a forwarding plane device is provided, configured to perform the method according to the ninth aspect or any possible implementation of the ninth aspect.

Specifically, the forwarding plane device may include units configured to perform the method according to the ninth aspect or any possible implementation of the ninth aspect.

According to an eleventh aspect, another forwarding plane device is provided, including a memory and a processor. The memory is configured to store an instruction. The processor is configured to execute the instruction stored in the memory. The execution of the instruction stored in the memory causes the processor to perform the method according to the ninth aspect or any possible implementation of the ninth aspect.

According to a twelfth aspect, a computer-readable storage medium is provided, configured to store a computer program. The computer program includes an instruction used to perform the method according to the ninth aspect or any possible implementation of the ninth aspect.

Based on the foregoing technical solutions, by means of the method and apparatus in the disclosure, the control plane device sends an instruction message to a forwarding plane device, to instruct the forwarding plane device to send a topology discovery packet at each port of the forwarding plane device; receives a message that is forwarded by another forwarding plane device and that carries identifiers of a receive end forwarding plane device, a receive end port, a transmit end forwarding plane, and a transmit end port; and further discovers a topology connection between the forwarding plane devices, so that packets sent from the control plane device to the forwarding plane device can be greatly reduced, thereby reducing processing overheads on a control plane.

DESCRIPTION OF EMBODIMENTS

The following clearly describes the technical solutions in the disclosure with reference to the accompanying drawings in the disclosure.

For ease of understanding of the disclosure, several elements to be introduced into descriptions of the disclosure are first described herein.

Software-defined networking (SDN): a technology of separating a control plane function and a forwarding plane function of a network device in which the control plane function and the forwarding plane function are integrated, unifying, in a logically centralized mode, the control plane function of the network device on a network controller, and globally managing and controlling the network device reserving the forwarding plane function and some control channel functions. A control plane and a forwarding plane are separated, the forwarding plane reserves a basic packet forwarding capability, and a forwarding policy is generated by the control plane and is delivered to the forwarding plane. After establishing a connection to the forwarding plane, the control plane discovers a connection between switch ports on the forwarding plane by using a link discovery technology, and then generates a topology instance of a network according to switch information and information about the connection between the switch ports.

Link discovery technology: which refers in particular to a link discovery technology applied to SDN in the disclosure, and is a technology used by a control plane in the SDN to discover a connection relationship between switch ports on a forwarding plane.

Figure 1:
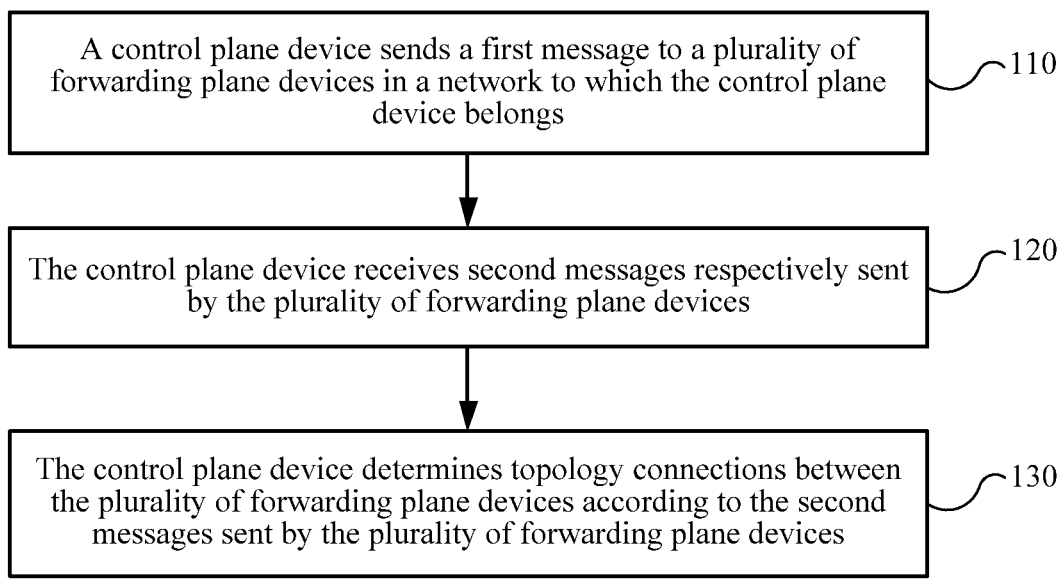
FIG. 1 is a schematic diagram of a link discovery method according to embodiments of the disclosure.

FIG. 1 is a flowchart of a link discovery method according to embodiments of the disclosure. The method in FIG. 1 is performed by a control plane device. It should be understood that the control plane device in the disclosure may be a network controller in SDN or the like.

Certainly, it should be understood that before performing the method shown in FIG. 1, the control plane device may further obtain identifiers of a plurality of forwarding plane devices in a network to which the control plane device belongs, identification information of a port of each forwarding plane device, and the like. For a specific implementation, refer to a method in the prior art. For example, when the control plane device is a network controller and the forwarding plane device is a switch, after establishing a connection to the switch, the network controller may obtain identification information of the switch by sending a features_request request, and obtain port information of the switch by sending a multipart_request request. In addition, the control plane device may further send a first flow entry to the plurality of forwarding plane devices in the network to which the control plane device belongs, to instruct the forwarding plane devices to forward a received topology discovery packet to the control plane device.

110: The control plane device sends a first message to a plurality of forwarding plane devices in a network to which the control plane device belongs.

The first message is used to instruct each forwarding plane device receiving the first message to send a topology discovery packet at all available ports of the forwarding plane device.

Specifically, the topology discovery packet may be an LLDP packet or the like.

Optionally, the first message carries a topology discovery packet sending period, and the first message is used to instruct the first forwarding plane device to use the topology discovery packet sending period as a sending period of the first topology discovery packet.

For example, the network controller may instruct, by using a set_config message with an extended function, the switch to periodically send the LLDP packet at all the available ports. In a specific implementation, a field may be newly added to a parameter in the set_config message to specify the sending period.

Alternatively, optionally, the first message is periodically sent by the control plane device.

Alternatively, optionally, the first message is sent by the control plane device in an event-triggered manner.

120: The control plane device receives second messages respectively sent by the plurality of forwarding plane devices.

Each of the second messages is generated, according to a first topology discovery packet received at a second port, by a second forwarding plane device sending the second message, the first topology discovery packet is a topology discovery packet sent by a first forwarding plane device in the plurality of forwarding plane devices at a first port, the first topology discovery packet carries identification information of the first forwarding plane device and identification information of the first port, and the second message carries the identification information of the first forwarding plane device, the identification information of the first port, identification information of the second forwarding plane device, and identification information of the second port.

It should be understood that the identification information of the first forwarding plane device and the identification information of the first port that are carried in the second message may exist in the second message in a form of a topology discovery packet, that is, the second message may carry the first topology discovery packet. That is, the second message carries the first topology discovery packet, the identification information of the second forwarding plane device, and the identification information of the second port.

Certainly, the second message may alternatively carry, in another manner, the identification information of the first forwarding plane device, the identification information of the first port, the identification information of the second forwarding plane device, and the identification information of the second port.

It should be understood that when the first forwarding plane device sends the first topology discovery packet at the first port, if a connection (or a link) from the first forwarding plane device to the second forwarding plane device exists, there is certainly a port on the second forwarding plane device to receive the first topology discovery packet. The second forwarding plane device may generate the second message according to the first topology discovery packet and send the second message to the control plane device.

130: The control plane device determines topology connections between the plurality of forwarding plane devices according to the second messages sent by the plurality of forwarding plane devices.

A first topology connection determined according to each of the second messages is a topology connection from the first port of the first forwarding plane device to the second port of the second forwarding plane device.

The control plane device may determine the topology connection from the first port of the first forwarding plane device to the second port of the second forwarding plane device according to the identification information of the first forwarding plane device, the identification information of the first port, the identification information of the second forwarding plane device, and the identification information of the second port that are carried in the second message.

Certainly, it should be understood that if the first topology discovery packet sent by the first forwarding plane device at the first port can reach the second port of the second forwarding plane device, a second topology discovery packet sent by the second forwarding plane device at the second port certainly can reach the first port of the first forwarding plane device. The control plane device further receives another second message sent by the first forwarding plane device, so as to determine a topology connection from the second port of the second forwarding plane device to the first port of the first forwarding plane device.

In embodiments of the disclosure, the control plane device sends an instruction message to a forwarding plane device, to instruct the forwarding plane device to send a topology discovery packet at each port of the forwarding plane device; receives a message that is forwarded by another forwarding plane device and that carries identifiers of a receive end forwarding plane device, a receive end port, a transmit end forwarding plane, and a transmit end port; and further discovers a topology connection between the forwarding plane devices, so that packets sent from the control plane device to the forwarding plane device can be greatly reduced, thereby reducing processing overheads on a control plane.

Optionally, before step 110, the method may further include step 101.

101: The control plane device sends a first flow entry to the plurality of forwarding plane devices.

The first flow entry is used to instruct the plurality of forwarding plane devices to forward a received topology discovery packet to the control plane device.

Optionally, no timeout time is set for the first flow entry. It should be understood that if no timeout time is set for the first flow entry, it means that the first flow entry does not become invalid due to a life period.

Alternatively, optionally, a first timeout time that is set for the first flow entry is greater than a preset threshold. It should be understood that when the first timeout time is set to a relatively large value, in a relatively long period (the first timeout time), the first flow entry does not become invalid due to a life period.

Optionally, after step 130, the method may further include step 140 to step 160.

140: The control plane device sends a second flow entry to the second forwarding plane device according to the first topology connection.

The second flow entry is used to instruct the second forwarding plane device to discard the first topology discovery packet, and a second timeout time related to a time at which the first topology connection becomes invalid is set for the second flow entry.

150: The control plane device receives a third message sent by the second forwarding plane device.

The third message is generated by the second forwarding plane device after the second flow entry times out and no matching packet is obtained. The third message is used to indicate that the second flow entry times out, is invalid, or is deleted.

160: The control plane device determines, according to the third message, that the first topology connection is invalid, and deletes the first topology connection.

In embodiments of the disclosure, the second forwarding plane device is instructed to discard the first topology discovery packet, so that the second message is prevented from being forwarded to the control plane device in each period according to the topology discovery packet when the first topology connection is effective, and sending of a message indicating that the first topology connection is invalid is triggered only after the first topology connection becomes invalid. Therefore, after a connection has been discovered, a quantity of packets sent by a forwarding plane device to the control plane device due to invalidity of the discovered connection is greatly reduced, occupied control channel bandwidth is reduced, and processing overheads of the control plane device are reduced.

The following further describes the method in the disclosure with reference to a specific embodiment.

Figure 2:
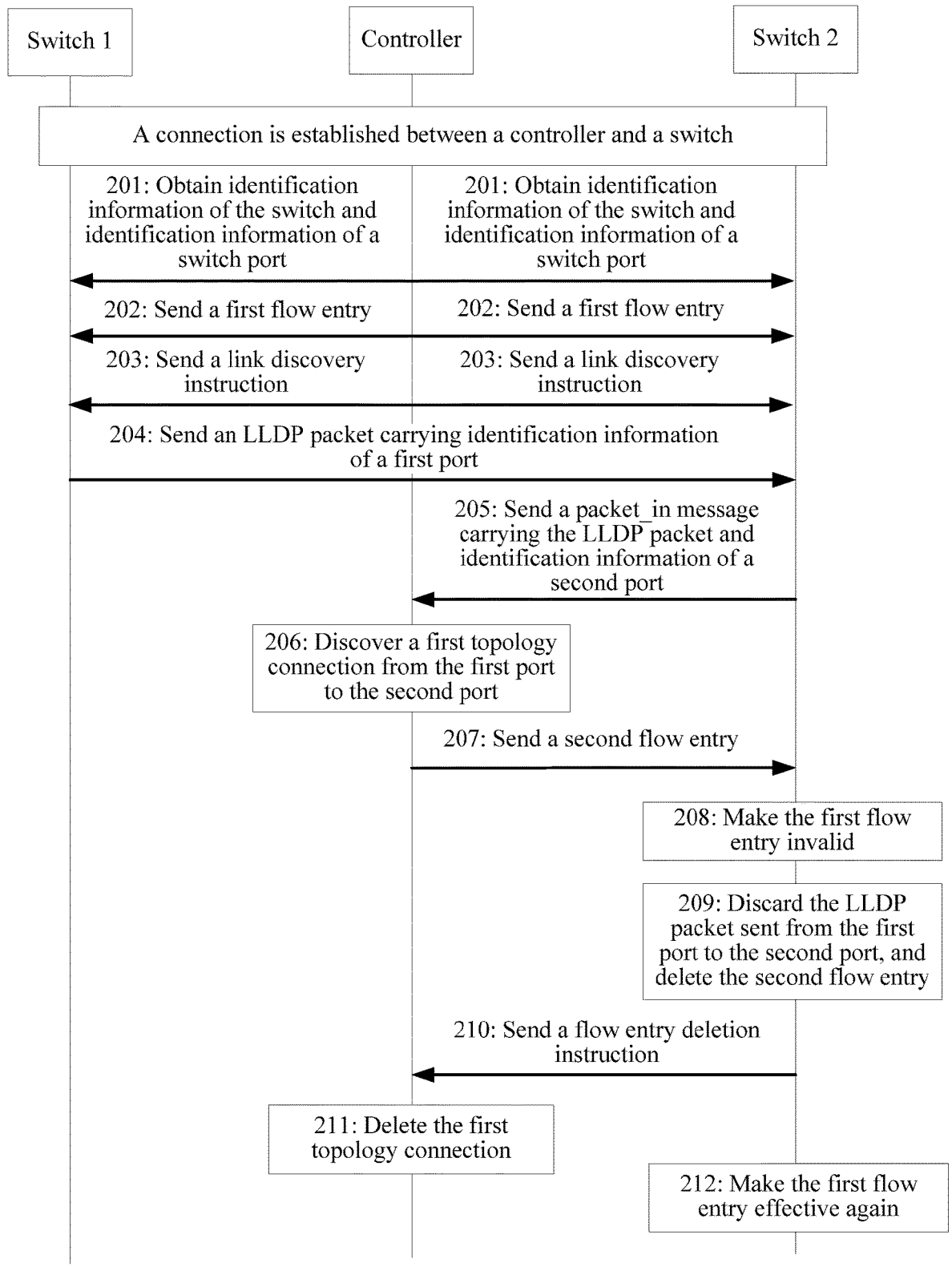
FIG. 2 is an interaction flowchart of a link discovery method according to embodiments of the disclosure.

FIG. 2 is an interaction flowchart of link discovery and invalidity according to embodiments of the disclosure. In embodiments of the disclosure, a control plane device is a network controller, that is, a controller shown in FIG. 2. A forwarding plane device is a switch, that is, a switch 1 and a switch 2 shown in FIG. 2. A method in embodiments of the disclosure is applied after a connection is established between a control plane device and a forwarding plane device in SDN.

201: The controller obtains identification information of the switch and identification information of a switch port.

It should be understood that before the controller obtains the identification information of the switch and the identification information of the switch port, the controller needs to establish a connection to the switch. A connection request for establishing the connection may be actively initiated by the controller to the switch, or may be actively initiated by the switch.

After establishing the connection to the switch, the controller may send a request message to all switches to request to obtain identification information of the switches and switch ports.

For example, the controller may request to obtain the identification information of the switches by sending a features_request request, and request to obtain the identification information of the switch ports by sending a multipart_request request.

202: The controller sends a first flow entry.

The controller sends the first flow entry to all the switches to instruct the switches to forward a received LLDP packet to the controller.

Specifically, no timeout time may be set for the flow entry, or a relatively long timeout time is set for the flow entry.

In addition, the controller may send the first flow entry in a plurality of message formats. For example, the controller may send the first flow entry by using a flow_mod message.

203: The controller sends a link discovery instruction.

The link discovery instruction in step 203 is the first message in step 110 in the embodiment shown in FIG. 1.

The controller sends the link discovery instruction to all the switches to instruct the switches to send a topology discovery packet such as an LLDP packet at all the ports of the switches.

In a specific implementation, the controller may periodically send the link discovery instruction to all the switches.

In another specific implementation, the link discovery instruction further carries a sending period to instruct the switches to send the LLDP packet in the sending period.

In still another specific implementation, the controller may send the link discovery instruction to all the switches according to results of triggering by some events.

The controller may send the link discovery instruction by using a set_config message or the like. Particularly, when the link discovery instruction further carries the sending period, the controller may add a field to the set_config message with an extended function to record the sending period.

204: The switch 1 sends an LLDP packet carrying identification information of a first port.

The LLDP packet in step 204 is the first topology discovery packet in step 120 in the embodiment shown in FIG. 1.

Using the switch 1 as an example, after receiving the link discovery instruction sent by the controller, the switch 1 may send the LLDP packet at all ports of the switch 1. The LLDP packet sent at each port carries identification information of the port and identification information of the switch 1.

For example, the switch 1 sends the LLDP packet at the first port, and the LLDP packet may carry the identification information of the first port and the identification information of the switch 1.

205: The switch 2 sends a packet_in message carrying the LLDP packet and identification information of a second port.

The packet_in message in step 205 is the second message in step 120 in the embodiment shown in FIG. 1.

Assuming that the switch 2 receives, at the second port of the switch 2, the LLDP packet sent by the switch 1 at the first port, the switch 2 may encapsulate the LLDP packet in the packet_in message according to an instruction of the first flow entry, write the identification information of the second port into the packet_in message, and then send the packet_in message to the controller. Certainly, it should be understood that the packet_in message sent by the switch 2 carries the identification information, for example, a source Media Access Control (MAC) address, of the switch 2 to indicate a source device sending the packet_in message.

Certainly, the switch 2 may send, by using a message in another format, the LLDP packet, the identification information of the second port, and the identification information of the switch 2. This is not limited herein in the disclosure.

206: The controller discovers a first topology connection from the first port to the second port.

After receiving the packet_in message, the controller obtains the identification information of the switch 1 and the identification information of the first port according to the LLDP packet encapsulated in the packet_in message, and obtains the identification information of the second port that is written into the packet_in message.

In addition, the controller may further obtain the identification information, such as the MAC address, of the switch 2 according to a sending source of the packet_in message, and further determine the switch 2.

The controller may determine the first topology connection from the first port of the switch 1 to the second port of the switch 2 according to the packet_in message sent by the switch 2.

The controller may determine, according to packet_in messages sent by all the switches in a network to which the controller belongs, topology connections between all the switches in the network to which the controller belongs, to implement a discovery process of a topology structure of the entire network.

207: The controller sends a second flow entry.

After completing a discovery process of the first topology connection, the controller may send the second flow entry to the switch 2 according to the first topology connection, set, for the second flow entry, a timeout time related to a time at which the first topology connection becomes invalid, and instruct the switch 2 not to forward the LLDP packet to the controller any longer when the switch 2 subsequently receives the LLDP packet at the second port.

In addition, the controller further stores a mapping relationship between a cookie field in the second flow entry and a corresponding connection (the first topology connection).

208: The switch 2 makes the first flow entry invalid.

After receiving the second flow entry, the switch 2 temporarily makes the first flow entry invalid because a processing priority of the second flow entry is higher than that of the first flow entry.

209: The switch 2 discards the LLDP packet sent from the first port to the second port and deletes the second flow entry.

After the switch 2 receives again, at the second port, the LLDP packet sent by the switch 1, the LLDP packet is preferentially matched with the second flow entry and is discarded, and is not forwarded to the controller again.

After the second flow entry times out and is not matched with a packet, the switch 2 may delete the second flow entry. Alternatively, the switch 2 may set the second flow entry to an invalid state or a timeout state.

210: The switch 2 sends a flow entry deletion instruction.

After the second flow entry times out, is deleted, or is invalid, the switch 2 may send the flow entry deletion instruction, to notify the controller that the second flow entry has timed out, has been deleted, or has become invalid.

For example, the switch 2 may send a flow_removed message to the controller.

211: The controller deletes the first topology connection.

The controller may learn, according to the flow_removed message, that the connection is invalid, obtain the invalid connection according to the returned cookie field in the flow_removed message, and delete the invalid connection.

212: The switch 2 makes the first flow entry effective again.

After the second flow entry is deleted due to timeout, the first flow entry having a relatively low priority becomes effective again. The switch 2 may resend the received LLDP packet to the controller after the connection becomes effective, so that the controller discovers the first topology connection.

Figure 3:
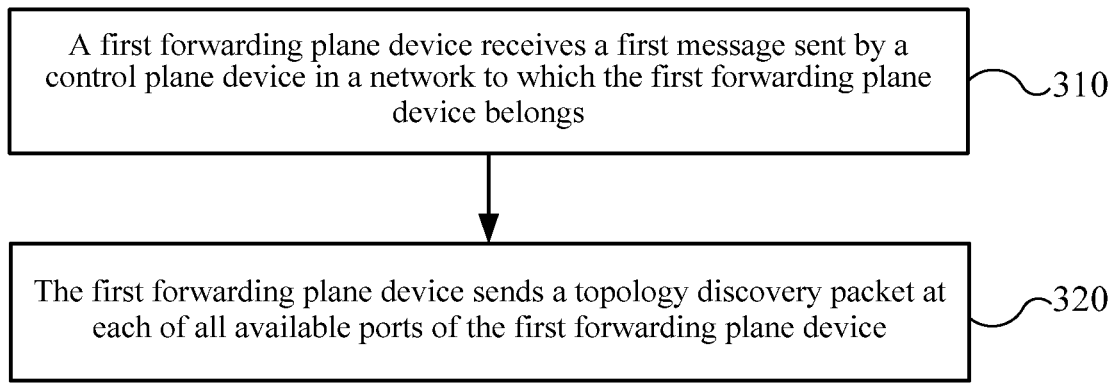
FIG. 3 is a schematic diagram of another link discovery method according to embodiments of the disclosure.

FIG. 3 is a flowchart of another link discovery method according to the disclosure. The method in FIG. 3 is performed by a first forwarding plane device. In the disclosure, the first forwarding plane device may be a switch or the like.

310: The first forwarding plane device receives a first message sent by a control plane device in a network to which the first forwarding plane device belongs.

The first message is used to instruct the first forwarding plane device to send a topology discovery packet at all available ports of the first forwarding plane device.

320: The first forwarding plane device sends a topology discovery packet at each of all available ports of the first forwarding plane device.

A first topology discovery packet sent at a first port carries identification information of the first forwarding plane device and identification information of the first port. A second forwarding plane device receiving the first topology discovery packet at a second port can send a second message to the control plane device according to the first topology discovery packet. The second message carries the identification information of the first forwarding plane device, the identification information of the first port, identification information of the second forwarding plane device, and identification information of the second port.

In the disclosure, the first forwarding plane device sends the topology discovery packet at all the available ports of the first forwarding plane device according to the first message of the control plane device, so that packets sent from the control plane device to a forwarding plane device can be reduced, thereby reducing processing overheads on a control plane.

Figure 4:
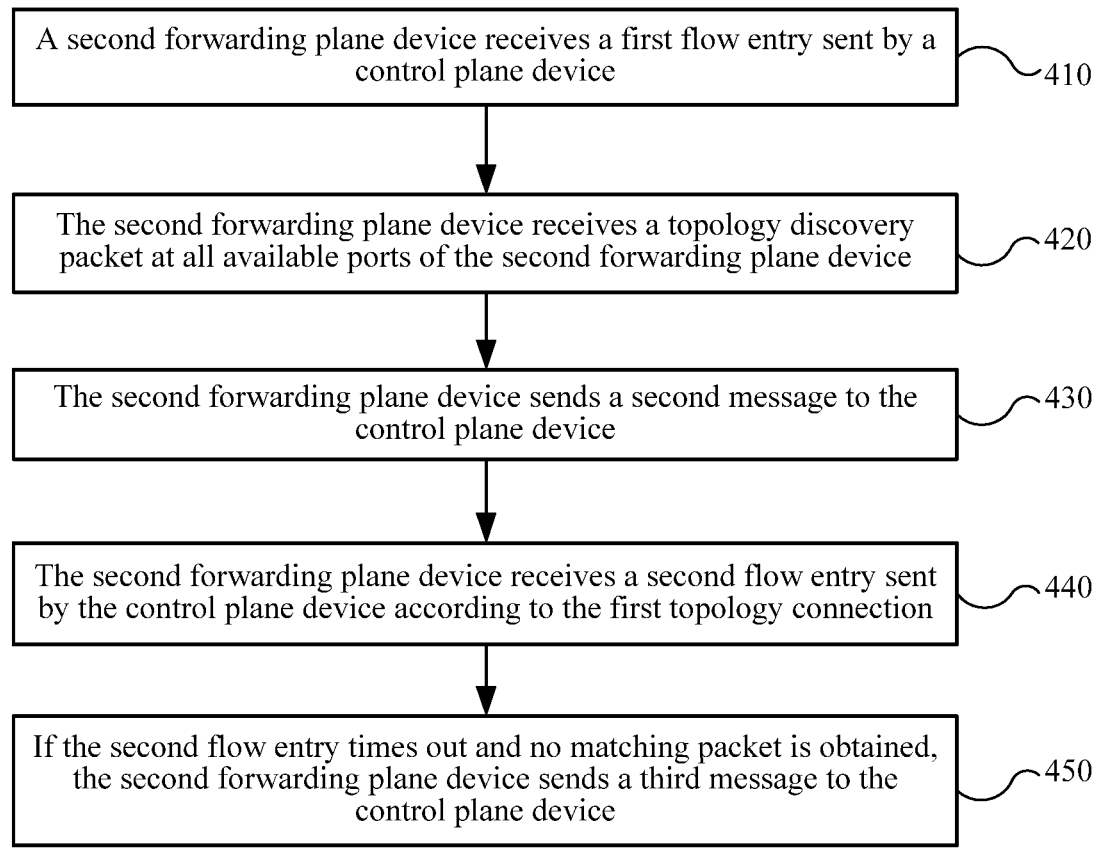
FIG. 4 is a schematic diagram of another link discovery method according to embodiments of the disclosure.

FIG. 4 is a flowchart of another link discovery method according to the disclosure. The method in FIG. 4 is performed by a second forwarding plane device. In embodiments of the disclosure, the second forwarding plane device may be a switch or the like.

410: The second forwarding plane device receives a first flow entry sent by a control plane device.

The first flow entry instructs the second forwarding plane device to forward a received topology discovery packet to the control plane device.

420: The second forwarding plane device receives a topology discovery packet at all available ports of the second forwarding plane device.

430: The second forwarding plane device sends a second message to the control plane device.

The second message is generated by the second forwarding plane device according to a first topology discovery packet received at a second port. The first topology discovery packet is a topology discovery packet sent by a first forwarding plane device in the plurality of forwarding plane devices at a first port, and the first topology discovery packet carries identification information of the first forwarding plane device and identification information of the first port. The second message carries the identification information of the first forwarding plane device, the identification information of the first port, identification information of the second forwarding plane device, and identification information of the second port, and the second message is used by the control plane device to establish a first topology connection from the first port of the first forwarding plane device to the second port of the second forwarding plane device.

Certainly, it should be understood that before step 430, the method may further include: generating, by the second forwarding plane device, the second message according to a received first topology discovery packet.

440: The second forwarding plane device receives a second flow entry sent by the control plane device according to the first topology connection.

The second flow entry is used to instruct the second forwarding plane device to make the first flow entry invalid and discard the first topology discovery packet, and a second timeout time related to a time at which the first topology connection becomes invalid is set for the second flow entry.

450: If the second flow entry times out and no matching packet is obtained, the second forwarding plane device sends a third message to the control plane device.

The third message is used to indicate that the second flow entry times out, is invalid, or is deleted, so that the control plane device determines, according to the third message, that the first topology connection is invalid, and deletes the first topology connection.

In the disclosure, the second forwarding plane device discards the first topology discovery packet according to the instruction of the second flow entry of the control plane device, so that the second message is prevented from being forwarded to the control plane device in each period according to the topology discovery packet when the first topology connection is effective, and sending of a message indicating that the first topology connection is invalid is triggered only after the first topology connection is invalid. Therefore, after a topology connection has been discovered, a quantity of packets sent by a forwarding plane device to the control plane device due to invalidity of the discovered topology connection is greatly reduced, occupied control channel bandwidth is reduced, and processing overheads of a control device are reduced.

Optionally, if the second flow entry times out, is invalid, or is deleted, the second forwarding plane device resets the first flow entry to an effective state.

The disclosure further discloses a control plane device 1, configured to perform the method performed by the control plane device in the embodiment shown in FIG. 1 or the method performed by the controller in the embodiment shown in FIG. 2. Specifically, the control plane device may include units configured to perform the method performed by the control plane device in the embodiment shown in FIG. 1.

The disclosure further discloses a forwarding plane device 1, configured to perform the method performed by the first forwarding plane device in the embodiment shown in FIG. 3 and the method performed by the switch 1 in the embodiment shown in FIG. 2. Specifically, the first forwarding plane device may include units configured to perform the method performed by the first forwarding plane device in the embodiment shown in FIG. 3.

The disclosure further discloses a forwarding plane device 2, configured to perform the method performed by the second forwarding plane device in the embodiment shown in FIG. 4 and the method performed by the switch 2 in the embodiment shown in FIG. 2. Specifically, the second forwarding plane device may include units configured to perform the method performed by the second forwarding plane device in the embodiment shown in FIG. 4.

The disclosure further discloses a control plane device 2. A schematic structural diagram of a physical apparatus of the control plane device 2 may be shown as a physical apparatus 500 in FIG. 5, and the control plane device 2 includes a processor 502, a memory 503, a transmitter 501, and a receiver 504.

The receiver 504, the transmitter 501, the processor 502, and the memory 503 are connected to each other by using a bus 505. The bus 505 may be an ISA bus, a PCI bus, an EISA bus, or the like. The bus may be classified into an address bus, a data bus, a control bus, or the like. For ease of illustration, in FIG. 5, the bus is represented by using only one double-sided arrow. This, however, does not indicate that there is only one bus or only one type of bus.

The memory 503 is configured to store a program. Specifically, the program may include program code, and the program code includes a computer operation instruction. The memory 503 may include a read-only memory and a random access memory, and provide an instruction and data to the processor 502. The memory 503 may include a high-speed RAM, and may further include a non-volatile memory, for example, at least one magnetic disk memory.

The processor 502 executes the program stored in the memory 503.

Specifically, in the control plane device 2, the processor 502 may be configured to: perform the method in the embodiment shown in FIG. 1, and implement functions of the control plane device in the embodiment shown in FIG. 1, or implement functions of the controller in the embodiment shown in FIG. 2.

The processor 502 may be an integrated circuit chip and has a signal processing capability. In an implementation process, the steps in the foregoing methods may be completed by using an integrated logical circuit of hardware in the processor 502 or instructions in a form of software in the processor 502. The processor 502 may be a general purpose processor, including a central processing unit (CPU), a network processor (NP), and the like; or may be a digital signal processor (DSP), an application-specific integrated circuit (ASIC), a field programmable gate array (FPGA), or another programmable logical device, discrete gate or transistor logic device, or discrete hardware assembly. The processor may implement or perform the methods, steps, and logical block diagrams that are disclosed in the disclosure. The general purpose processor may be a microprocessor, or the processor may be any conventional processor, or the like. The steps in the methods disclosed with reference to the disclosure may be directly represented as being performed and completed by a hardware decoding processor, or being performed and completed by using a combination of hardware and software modules in the decoding processor. The software module may be located in a mature storage medium in the art, such as a random access memory, a flash memory, a read-only memory, a programmable read-only memory, an electrically-erasable programmable memory, or a register. The storage medium is located in the memory 503, and the processor 502 reads information in the memory 503 and completes the steps in the foregoing methods in combination with hardware of the processor 502.

Figure 5:
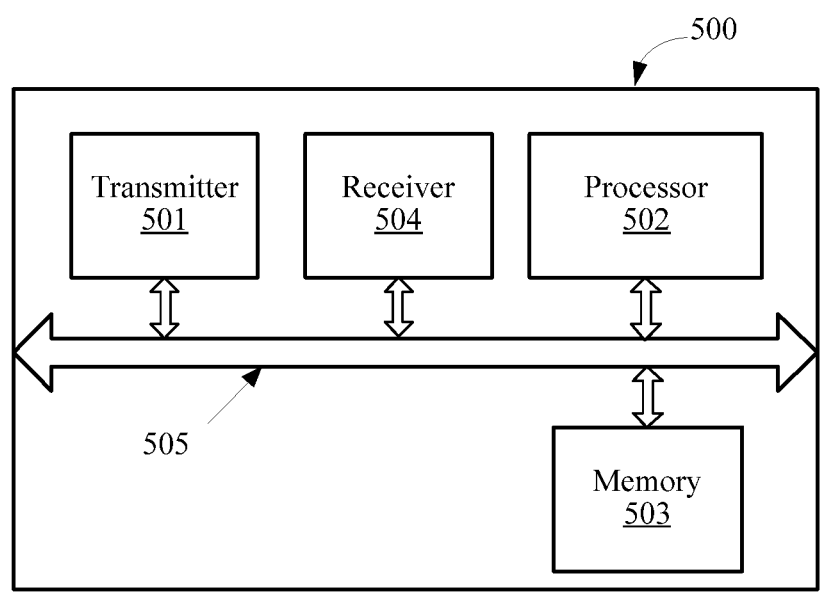
FIG. 5 is a schematic structural diagram of a physical apparatus according to embodiments of the disclosure.

The disclosure further discloses a forwarding plane device 3, and a schematic structural diagram of a physical apparatus of the forwarding plane device 3 may be shown in FIG. 5. Physical units included in the forwarding plane device 3 are similar to the physical units included in the control plane device 2, and details are not described again.

Specifically, in the forwarding plane device 3, the processor 502 may be configured to: perform the method in the embodiment shown in FIG. 3, and implement functions of the first forwarding plane device in the embodiment shown in FIG. 3, or implement functions of the switch 1 in the embodiment shown in FIG. 2.

The disclosure further discloses a forwarding plane device 4, and a schematic structural diagram of a physical apparatus of the forwarding plane device 4 may be shown in FIG. 5. Physical units included in the forwarding plane device 4 are similar to the physical units included in the control plane device 2, and details are not described again.

Specifically, in the forwarding plane device 4, the processor 502 may be configured to: perform the method in the embodiment shown in FIG. 4, and implement functions of the second forwarding plane device in the embodiment shown in FIG. 4, or implement functions of the switch 2 in the embodiment shown in FIG. 2.

The disclosure further provides a computer-readable storage medium 1. The computer-readable storage medium stores one or more programs. The one or more programs include an instruction, and when executed by a portable electronic device including a plurality of application programs, the instruction can cause the portable electronic device to perform the method in the embodiment shown in FIG. 1.

The disclosure further provides a computer-readable storage medium 2. The computer-readable storage medium stores one or more programs. The one or more programs include an instruction, and when executed by a portable electronic device including a plurality of application programs, the instruction can cause the portable electronic device to perform the method in the embodiment shown in FIG. 3.

The disclosure further provides a computer-readable storage medium 3. The computer-readable storage medium stores one or more programs. The one or more programs include an instruction, and when executed by a portable electronic device including a plurality of application programs, the instruction can cause the portable electronic device to perform the method in the embodiment shown in FIG. 4.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the disclosure, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the disclosure, but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

What is claimed is:

1. A link discovery method, comprising:

sending, by a control plane device, a first flow entry to a plurality of forwarding plane devices, wherein the first flow entry instructs the plurality of forwarding plane devices to forward a received topology discovery packet to the control plane device, wherein no time out time is set for the first flow entry; or a first timeout time that is set for the first flow entry is greater than a preset threshold;

sending, by the control plane device, a first message to the plurality of forwarding plane devices, wherein the first message instructs each forwarding plane device receiving the first message to send a topology discovery packet at all available ports of the respective forwarding plane device, wherein the control plane device sends the first flow entry to the plurality of forwarding plane devices before the control plane device sends the first message to the plurality of forwarding plane devices;

receiving, by the control plane device, second messages respectively sent by the plurality of forwarding plane devices, wherein one of the second messages is generated by a second forwarding plane device sending the one of the second messages according to a first topology discovery packet received at a second port of the second forwarding plane device, the first topology discovery packet is a topology discovery packet sent by a first forwarding plane device in the plurality of forwarding plane devices at a first port, the first topology discovery packet carries identification information of the first forwarding plane device and identification information of the first port, and the one of the second messages carries the identification information of the first forwarding plane device, the identification information of the first port, identification information of the second forwarding plane device, and identification information of the second port; and determining, by the control plane device, topology connections between the plurality of forwarding plane devices according to the second messages sent by the plurality of forwarding plane devices, wherein a first topology connection determined according to the one of the second messages comprises a topology connection from the first port of the first forwarding plane device to the second port of the second forwarding plane device.

2. The link discovery method according to claim 1, wherein the first message carries a topology discovery packet sending period, and the first message instructs the plurality of forwarding plane devices to use the topology discovery packet sending period as a sending period of the topology discovery packet.

3. The link discovery method according to claim 1, wherein the first message is periodically sent by the control plane device.

4. The link discovery method according to claim 1, further comprising:

sending, by the control plane device, a second flow entry to the second forwarding plane device according to the first topology connection, wherein the second flow entry instructs the second forwarding plane device to discard the first topology discovery packet, and a second timeout time related to a time at which the first topology connection becomes invalid is set for the second flow entry;

receiving, by the control plane device, a third message sent by the second forwarding plane device, wherein the third message is generated by the second forwarding plane device after the second flow entry times out and no matching packet is obtained, and the third message indicates that the second flow entry times out, is invalid, or is deleted; and determining, by the control plane device according to the third message, that the first topology connection is invalid, and deleting the first topology connection.

5. A link discovery method, comprising:

receiving, by a second forwarding plane device, a first flow entry sent by a control plane device, wherein the first flow entry instructs the second forwarding plane device to forward a received topology discovery packet to the control plane device;

receiving, by the second forwarding plane device, the topology discovery packet at all available ports of the second forwarding plane device;

sending, by the second forwarding plane device, a second message to the control plane device, wherein the second messages is generated by the second forwarding plane device according to a first topology discovery packet received at a second port, the first topology discovery packet is a topology discovery packet sent by a first forwarding plane device in a plurality of forwarding plane devices at a first port, the first topology discovery packet carries identification information of the first forwarding plane device and identification information of the first port, the second message carries the identification information of the first forwarding plane device, the identification information of the first port, identification information of the second forwarding plane device, and identification information of the second port, and the control plane device establishes a first topology connection from the first port of the first forwarding plane device to the second port of the second forwarding plane device based on the second message;

receiving, by the second forwarding plane device, a second flow entry sent by the control plane device according to the first topology connection, wherein the second flow entry instructs the second forwarding plane device to make the first flow entry invalid and discard the first topology discovery packet, and a second timeout time related to a time at which the first topology connection becomes invalid is set for the second flow entry; and if the second flow entry times out and no matching packet is obtained, sending, by the second forwarding plane device, a third message to the control plane device, wherein the third message indicates that the second flow entry times out, is invalid, or is deleted, so that the control plane device determines, according to the third message, that the first topology connection is invalid, and deletes the first topology connection.

6. The link discovery method according to claim 5, wherein if the second flow entry times out, is invalid, or is deleted, resetting, by the second forwarding plane device, the first flow entry to an effective state.

7. A control plane device, comprising:
a sending unit, a receiving unit, and a determining unit, wherein
the sending unit is configured to send a first flow entry to a plurality of forwarding plane devices, wherein the first flow entry instructs the plurality of forwarding plane devices to forward a received topology discovery packet to the control plane device, wherein no timeout time is set for the first flow entry; or a first timeout time that is set for the first flow entry is greater than a preset threshold;
the sending unit is further configured to send a first message to the plurality of forwarding plane devices, wherein the first message instructs each forwarding plane device receiving the first message to send a topology discovery packet at all available ports of the respective forwarding plane device;
the receiving unit is configured to receive second messages respectively sent by the plurality of forwarding plane devices, wherein one of the second messages is generated by a second forwarding plane device sending the one of the second messages according to a first topology discovery packet received at a second port of the second forwarding plane device, the first topology discovery packet is a topology discovery packet sent by a first forwarding plane device in the plurality of forwarding plane devices at a first port, the first topology discovery packet carries identification information of the first forwarding plane device and identification information of the first port, and the one of the second messages carries the identification information of the first forwarding plane device, the identification information of the first port, identification information of the second forwarding plane device, and identification information of the second port; and
the determining unit is configured to determine topology connections between the plurality of forwarding plane devices according to the second messages sent by the plurality of forwarding plane devices, wherein a first topology connection determined according to the one of the second messages comprises a topology connection from the first port of the first forwarding plane device to the second port of the second forwarding plane device.

8. The control plane device according to claim 7, wherein the first message carries a topology discovery packet sending period, and the first message instructs the plurality of forwarding plane devices to use the topology discovery packet sending period as a sending period of the topology discovery packet.

9. The control plane device according to claim 7, wherein the first message is periodically sent by the control plane device.

10. The control plane device according to claim 7, wherein the control plane device further comprises a deletion unit;
the sending unit is further configured to send a second flow entry to the second forwarding plane device according to the first topology connection, wherein the second flow entry instructs the second forwarding plane device to discard the first topology discovery packet, and a second timeout time related to a time at which the first topology connection becomes invalid is set for the second flow entry;
the receiving unit is further configured to receive a third message sent by the second forwarding plane device, wherein the third message is generated by the second forwarding plane device after the second flow entry times out and no matching packet is obtained, and the third message indicates that the second flow entry times out, is invalid, or is deleted;
the determining unit is further configured to determine, according to the third message, that the first topology connection is invalid; and
the deletion unit is configured to delete the first topology connection after the determining unit determines that the first topology connection is invalid.

\* \* \* \* \*